UNITED STATES PATENT OFFICE.

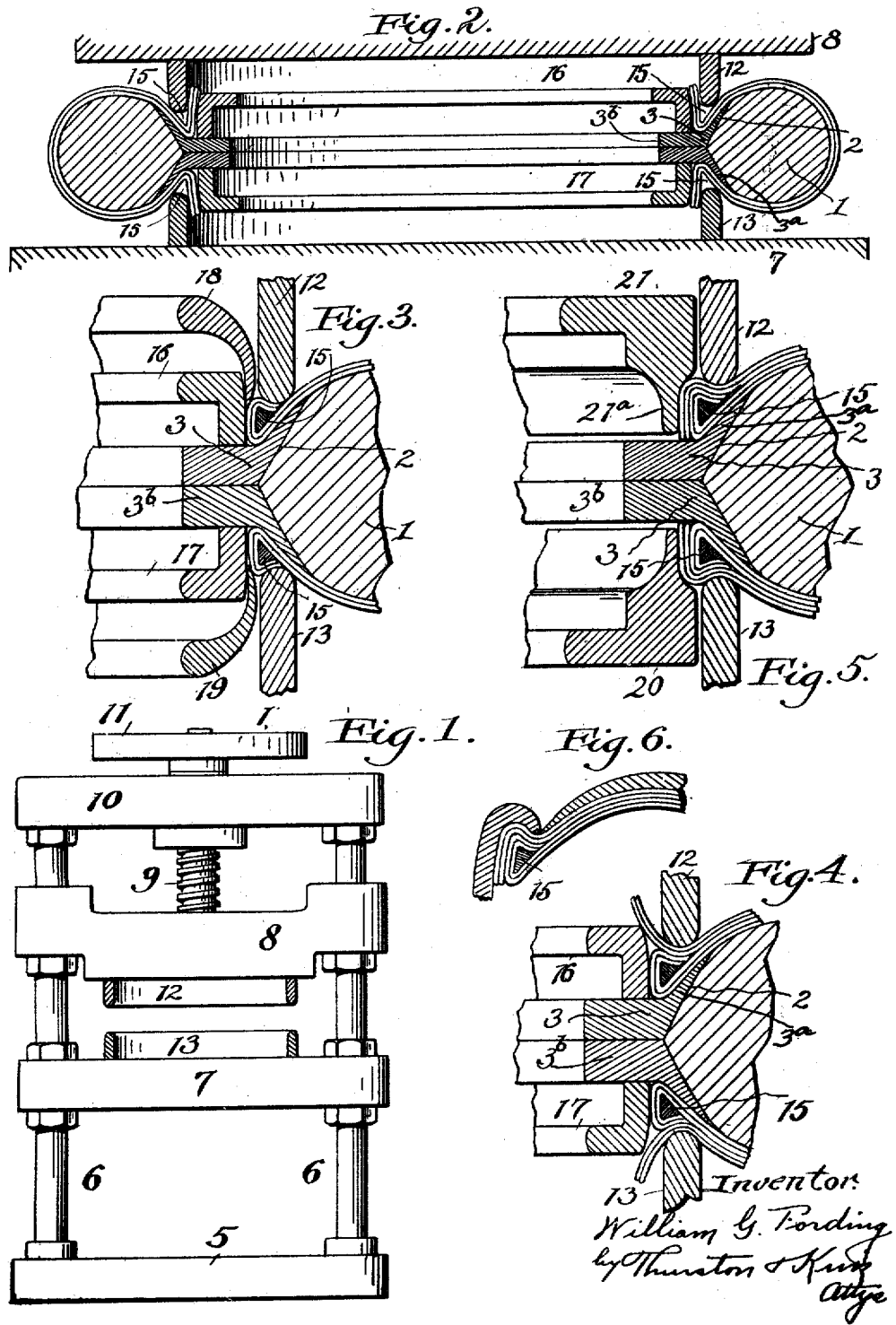

WILLIAM G. FORDING, OF CLEVELAND, OHIO, ASSIGNOR TO JOHN T. LISTER, OF CLEVELAND, OHIO.

METHOD FOR PUTTING BEADS ON TIRE-CARCASSES.

1,348,164.   Specification of Letters Patent.   Patented Aug. 3, 1920.

Application filed March 10, 1916. Serial No. 73,216.

*To all whom it may concern:*

Be it known that I, WILLIAM G. FORDING, a citizen of the United States, residing at Cleveland, in the county of Cuyahoga and State of Ohio, have invented a certain new and useful Improvement in Methods for Putting Beads on Tire-Carcasses, of which the following is a full, clear, and exact description.

This invention relates to a method and the apparatus by which the method may be carried out for forming what is known as a bead upon a tire carcass.

The method is particularly applicable to a tire carcass made of a tire strip such as disclosed in my Patents No. 1,147,252 and No. 1,147,253, although I do not wish to limit the invention herein disclosed to be used with the particular material disclosed in said application, as it may be used in connection with the placing of beads upon tire carcasses formed in a manner other than disclosed in the said patents.

Generally speaking, the invention may be said to comprise the various instrumentalities and methods set forth in the accompanying claims.

Reference should be had to the accompanying drawings forming a part of this specification, in which Figure 1 is a front elevation of a press in which the method disclosed in this application may be carried out; Fig. 2 is a sectional view showing portions of the press and apparatus performing one step of my method in connection with placing a bead on a tire carcass; Fig. 3 is a sectional elevation of a portion of the apparatus and parts coöperating performing one step of my method; Fig. 4 shows a portion of the apparatus and sectional elevation performing one step of my process; Fig. 5 shows a portion of the apparatus and sectional elevation for performing a step of my method; Fig. 6 shows in section a portion of the finished type having the bead applied thereto in accordance with my method and further showing the manner in which the bead would coöperate with a rim.

The carcass upon which it is is desired to form a bead, is always received for such an operation while the carcass is in an uncured condition, which means that the fabric of which the carcass is composed is impregnated more or less with rubber solution in which the rubber is in an unvulcanized condition. This makes the various parts more or less sticky, so that when in the process to be described, parts of the carcass are folded, they will stay in the positions in which they are folded, the various parts thus folded sticking to each other, because of the unvulcanized rubber in semi-plastic condition with which the carcass is impregnated.

The carcass as received for the purpose of applying the bead thereto is in general of the form both throughout the length of its periphery and transversely of the tire the same as that which the finished casing or tire is to assume and upon the inner periphery of the carcass there is a slit which extends throughout the inner peripheral length. Both edges of this slit have depending extensions of the fabric, which extensions are integral with the material of which the carcass is formed. These extensions are pliable, so that they may be worked and folded.

We will consider the carcass as being formed of two layers of fabric as shown in the drawing, which layers of fabric it will be understood are suitably united together by a rubber cementing agency, as perhaps a layer of raw rubber between the fabric layers. This carcass is placed on a mandrel or core such as indicated at 1, the mandrel or core being of a size suitable to accommodate the size of the carcass being operated upon. This core may be of any well known form of collapsible core, so that the core may be readily inserted and removed from the carcass. The inner peripheral portion of the core is provided with slanting surfaces 2, the slanting surfaces approaching each other and coming to a point at substantially the middle portion of the periphery of the core.

Coöperating with the inner peripheral portion of the core are two wedges indicated at 3. These wedges are alike and provided with extensions 3ª which coöperate with the slanting surfaces 2 upon the core and upon their outer surfaces they form an extension of the outer surface of the core and receive the inner portion of the carcass. The wedges 3 have inwardly extending flanges 3ᵇ which engage each other, and also the wedges are so constructed that they may be removed to remove the core.

The carcass when thus assembled is placed within any suitable apparatus such as that shown in Fig. 1 by which pressure may be applied. The apparatus disclosed in Fig. 1 comprises a press which has a base 5 with upstanding guiding rods 6. On these rods is stationarily fixed a bed 7 and above the bed is a movable head 8 which is mounted upon a screw 9. The screw 9 extends through a threaded opening in the plate 10 which is secured to the rods 6. Screw 10 has a portion thereof which extends beyond the top plate 10. A wheel 11 is secured to the screw and may be operated to raise and lower the head 8. It will be seen that the head 8 may be made to approach or recede from the bed 7.

Upon the adjacent faces of the bed 7 and the head 8 there may be placed various implements which may be used in the operation of placing the bead upon the carcass. Examples of such implements are represented at 12 and 13 in Fig. 1.

Referring to Fig. 2, there is shown an assemblage of parts by which the first steps in my method may be accomplished. Upon the bed 7 is an annular member 13, which is of course, of proper diameter to accommodate the particular size of tire carcass which is being operated upon. Between the annular member 13 and the carcass is an annular ring or beading 15. This annular ring is of rubber which is vulcanized until it is hard, resembling somewhat the ordinary and well known hard rubber.

Coöperating with the flanges 3$^b$ upon the wedges 3 are annular members 16 and 17. The member 17, as will be seen, is of slightly less diameter than the diameter of the annular member 13, so that the annular member 13 may, when it is pressed, move in between the inclined portions of the wedges 3 and the outer peripheral portion of the annular member 17.

Upon the upper side of the carcass the parts just described and in the same relationship are duplicated. The annular ring member 12 coöperates with the bead ring 15 and presses between the arm 3$^a$ of the wedge 3 and the annular ring like member 16.

The rings 16 and 17 may be suitably supported or otherwise secured together.

When the head 8 is made to approach the base 7 with the parts arranged as shown in Fig. 2, the carcass or fabric which is upon the core 1 is drawn tightly over the core by the wedging or drawing action imparted to the bead ring 15 by the annular formers 12 and 13. The annular members 16 and 17 prevent any spreading action taking place.

When the compression has taken place as just explained, the head 8 is elevated and annular implements 18 and 19 are introduced outside of the members 16 and 17. Each of these implements just mentioned has a long lip, the lip approaching an edge as will be clearly seen from Fig. 3. The edge of the lip fits just outside of the outer diameter or the peripheral surface of the members 16 and 17 and is within the loose flap, which it will be seen from Fig. 3, extends between the former 12 and ring 16 and between the former 13 and the ring 17. With the implements 18 and 19 thus in place, the extending portions or flaps of the carcass which have just been mentioned are bent back into the path of the formers 12 and 13. Therefore, when the head 8 is subsequently lowered, the formers 12 and 13 will engage the flaps of the carcass and positively push the flaps against the outer portion of the rings 15 and 16, thus the flap depending portion of the carcass is caused to fold around or infold the bead rings 15 which thus form a bead upon the opposite sides of the carcass.

The members 20 and 21 as well as the members 18 and 19 may be suitably supported or secured to each other in any desired manner.

It will usually be desirable to have more than two layers of fabric composing the carcass and therefore I provide as an extension or further step in my method, to place a second two layers of fabric upon the core 1 and fold the depending or flap portion of the carcass around the bead of the tire carcass. This next step in my process may be more clearly understood by reference to Fig. 4 in which the annular or ring like members 18 and 19 have been removed and the carcass is stretched upon the core 1 in substantially the same manner as that shown in Fig. 2. The operation of bringing the former members 12 and 13 toward each other tightly stretches the carcass over the fabric previously laid upon the core, and also presses the flaps or depending portions of the carcass into close engagement with the infolded portions or beads at the inner portion of the tire carcass.

When this operation is complete, the members 12 and 13 are relatively drawn away from each other and the members 16 and 17 are removed.

In this step of my process, I use not only the former members 12 and 13, but additional former members indicated at 20 and 21. These former members are ring like in form and in cross section are of the shape shown in Fig. 5. It will be seen that the members 20 and 21 are formed with a depending lip 21$^a$ which is grooved in on the side which is near the former members 12 and 13 and at its outer portion lies adjacent the former members 12 and 13. When these members 20 and 21 are assembled, they are moved relatively toward each other and the former members 12 and 13 hold the outer portions of the carcass from buckling or moving, while the members 20 and 21 push in the loose flap of the carcass which, as will be seen from Fig. 4, extends beyond the formers 12 and 13, so that this flap or loose portion is folded against the infolding strip of the layers which have previously been folded upon the bead ring 15.

As before stated, the fabric comprising the original two layers and the outer two layers are all impregnated with rubber solution in an unvulcanized condition and therefore the depending loose portions which are folded to form the bead of the tire will adhere to the fabric upon which they are folded in the various steps just described, due to the adhesion produced by the stickiness of the rubber solution in the fabric.

Of course, it is possible to add more layers to the carcass of the tire and in the event that another two layers were added to the four which we have described, the last two steps of the process, viz: those steps illustrated in Figs. 4 and 5, would be repeated.

When the last folding and pressing illustrated in Fig. 5 has been completed, the carcass is removed from the machine and the core removed from the carcass and the carcass is ready to have the outer tread or covering of rubber which is usually placed on tires, affixed thereto and the whole to be vulcanized in the usual and well known manner.

Having described my invention, I claim:—

1. The process of forming a bead on a split tire carcass having loose extensions upon both sides of the inner peripheral split which consists in pressing oppositely disposed ring like members against the opposite sides of the carcass adjacent the place thereon at which the bead is to be formed, pressing the rings with uniform pressure simultaneously applied to all of the rings and folding the loose extensions around the ring like member and pressing the extension into contact with all portions of the ring like member.

2. The process of forming a bead on a tire carcass having loose extensions on both sides of the inner peripheral split which consists in placing the carcass on a core, placing oppositely disposed ring like members in contact with the carcass at the place thereon at which it is desired to form the bead, holding the rings against displacement, pressing the rings with uniform pressure simultaneously applied to all parts of the rings to draw the carcass tight about the core and the ring into close contact with the carcass, folding the loose extensions of the carcass about the ring like member and exerting pressure upon the folded portions of the loose extensions to press the loose extensions into contact with all parts of the ring like member.

3. The process of forming a bead on a tire carcass having loose extensions on both sides of the inner peripheral split which consists in placing the carcass on a core, placing oppositely disposed ring-like members in contact with the carcass on the places thereon at which it is desired to form a bead holding the rings against displacement, pressing the rings with uniform pressure simultaneously applied to all parts of the rings thereby to draw the carcass tight about the core and the ring into close contact with the carcass, folding the loose extensions of the carcass in part about the ring-like members while maintaining the pressure on the ring-like members, then holding the ring-like members with the carcass partially folded about and folding the remaining portion of the extensions of the carcass about the ring-like members.

4. The process of forming a bead on a tire carcass having loose extensions upon both sides of the inner peripheral split which consists in placing the carcass on the core, placing oppositely disposed ring like members against opposite sides of the carcass adjacent the portions of said carcass at which the bead is to be formed, applying uniform pressure simultaneously to all parts of the ring-like members whereby to draw the carcass tight about the core and the rings into close contact with the carcass, folding the loose extensions around the ring like members and pressing them, then placing a second layer of fabric upon the outside of the carcass, applying pressure to stretch the carcass upon the core and into contact with the already folded loose extensions of the first layers, folding the loose extensions of the second layers applied about the portion of the carcass which infolds the ring like members and applying pressure to said folded portions.

In testimony whereof I hereunto affix my signature.

WILLIAM G. FORDING.